Sept. 7, 1943. P. G. HENDERSON ET AL 2,329,117
FISHING DEVICE
Filed April 12, 1941
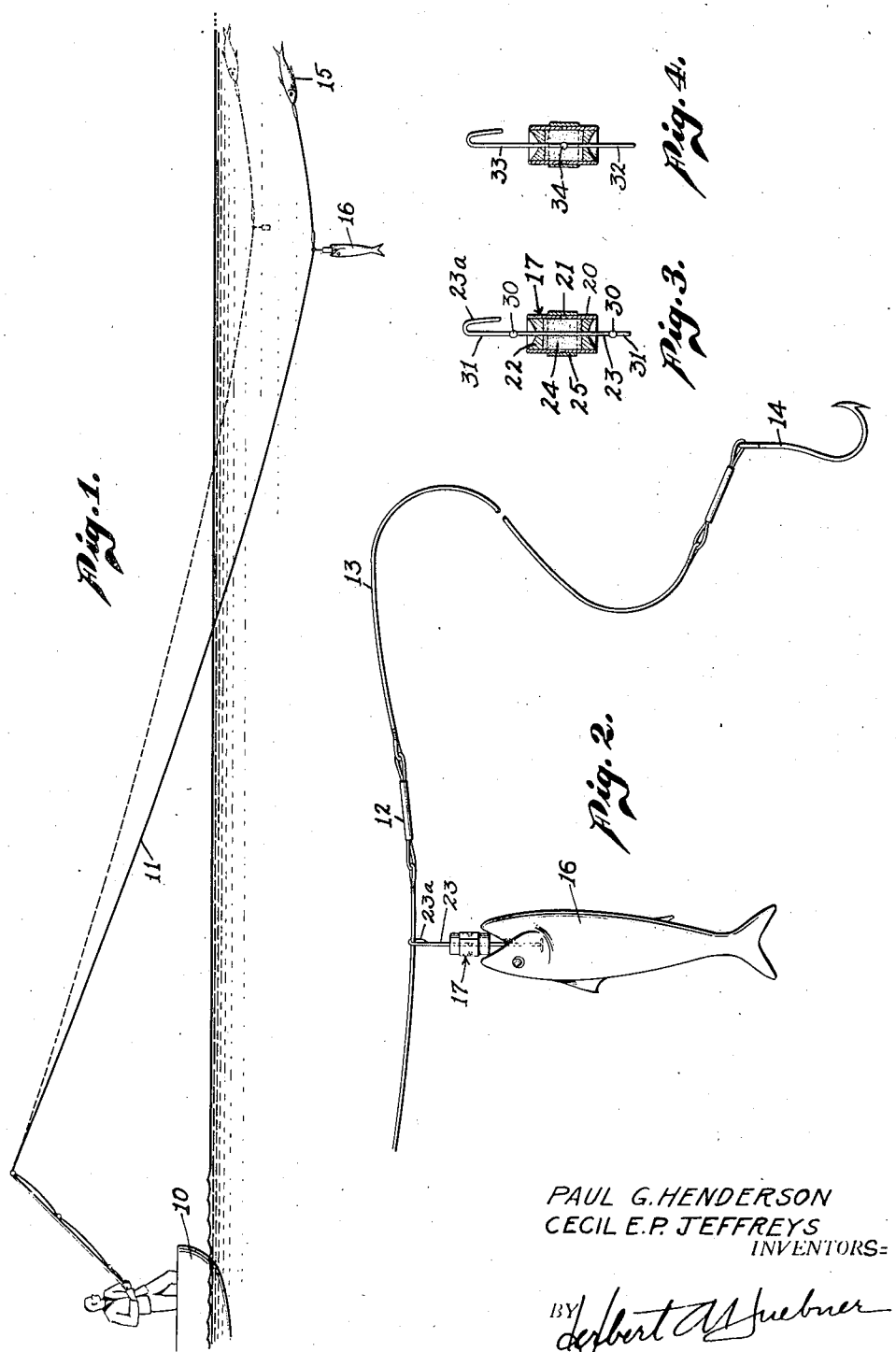
PAUL G. HENDERSON
CECIL E. P. JEFFREYS
INVENTORS:
ATTORNEYS.

Patented Sept. 7, 1943

2,329,117

UNITED STATES PATENT OFFICE 2,329,117

FISHING DEVICE

Paul G. Henderson and Cecil E. P. Jeffreys, Los Angeles, Calif.; said Jeffreys assignor to said Henderson Application April 12, 1941, Serial No. 388,282

8 Claims. (Cl. 43—28)

This invention relates to an item of fishing tackle, and particularly to an attachment for releasably securing a sinker or weightable substance to a fishing line, whereby the line, bait and sinker may be cast a considerable distance and the sinker, or weightable substance released when the line and said sinker or weightable substance, strikes the water so that the bait or lure will remain at or near the surface of the water.

In certain types of game fishing, for example fishing with live bait for yellowtail, barracuda, small tuna and other game fish of the same general size which inhabit similar water, it is desirable to cast the baited hook a considerable distance from the boat, and it is also desirable that at the conclusion of the cast the line and live bait remain at or near the surface of the water, as such location has been found by experience to offer the best location for hooking these types of game fish.

The live bait ordinarily used in this type of fishing is not heavy enough to enable a long cast to be made, and it cannot be whipped back and forth as in fly casting. If a stationary or permanent weight is attached to the line or to the leader near the live bait to facilitate casting, such a weight pulls the line and live bait downward immediately upon striking the water and carries the bait below the region where yellowtail normally strike. We use yellowtail only as an example, there being as already explained several other fish which will strike live bait at or near the surface of the water but do not ordinarily feed at a depth to which a stationary or permanent sinker would carry the bait.

It is an object of our invention to provide means for attaching a sinker or weightable substance to a fishing line which will be severed upon the sinker or weightable substance striking the water so that the sinker will fall to the bottom, leaving the line and the live bait floating at or near the surface of the water, within the area where the cast is completed.

A further object is to provide by means of a device of the character described, automatic means for severing the connection of a sinker or weightable substance to the line, actuated by the presence of water on the connecting means.

Another object is to provide a device of the character described which incorporates a spliced wire for coupling the sinker or weightable substance to the fishing line and which splice is destroyed or severed by chemical action initiated by the water into which the sinker or weightable substance and line is cast.

Other advantages and objects will become apparent from a further consideration of the specification and drawing.

In the drawing:

Figure 1 is a schematic view illustrating the use of our invention.

Figure 2 is an elevational view of the invention shown applied to a fishing line.

Figure 3 is a vertical cross section of one form of the invention.

Figure 4 is a section similar to Figure 3 illustrating another form of the invention.

Referring to Figure 1, a boat 10 is represented from which a fisherman casts a fishing line 11 to a distance substantially remote from the boat. The line is equipped with our invention subsequently described in detail. The full lines of Figure 1 illustrate the approximate position which the line attains soon after it strikes the water; and the dotted line shows the approximate position which the fishing line assumes after the action has taken place which releases the sinker, or other weightable substance and frees the line so that it may normally float at or near the surface.

The line 11 conventionally has secured to it a swivel 12, a leader 13, and a swivel hook 14, to the latter of which is fastened a minnow, sardine, or other live bait fish 15. It is usual to attach the live bait to the hook in a manner so that the live bait will swim around as a lure.

To the line 11 we attach a sinker 16 by means of our coupling device 17. The sinker may be of any desired shape and weight, it being designed or selected in relation to the weight and length of the fishing line to secure the maximum desired cast. We prefer to form it in the shape of a bait fish as illustrated, which enables us to attach the device 17 close to or partly within the open mouth of the artificial fish. The point of attachment of the coupling device 17 to the line depends upon the fisherman's own choice of tackle. In the illustration, the attachment is to the line near its connection with the leader, and assuming a three or four foot leader, the attachment is about four feet from the bait. Some fishermen prefer to use a different hookup and to extend the line or leader beyond the bait and attach the sinker or weightable substance beyond the bait. This is immaterial to our invention, as it may be utilized in either manner, although it is preferably secured within about four feet of the bait either above or below.

The form of attaching device 17 chosen for illustration comprises a paper capsule 20 provided with perforations 21 in the central region, and closed at the ends by paraffine wax 22. Extending through the capsule is a wire or ribbon 23 made of a metal fusible at low temperature. A good example is Liebowitz alloy, comprised of bismuth fifty per cent, lead twenty five per cent, cadmium twelve and one-half per cent, and tin twelve and one-half per cent. Any other suitable low temperature fusing alloy or metal may be employed. This wire or ribbon, or extensions thereof, should have one end embedded in the sinker as illustrated by dotted lines in Figure 2, and the other end formed in a loop 23a to be slipped over a fishing line and secured thereto by being pinched or twisted thereon.

Enclosing the wire 23 within the capsule is a chemical 24 which reacts strongly exothermically with water. A good example of a suitable chemical is anhydrous aluminum chloride. Other chemicals, such for example as phosphoric anhydride, may be used.

A waterproof tape 25 is wound around the capsule to cover the perforations and protect the chemical from moisture in the air. The entire capsule is preferably coated with paraffine to render it entirely moisture proof. Wax other than paraffine may be substituted, waxes in general being waterproof and satisfactory for the purpose.

A gelatin capsule may be substituted for the paper capsule but a thin brown paper will suffice and is cheaper, and there are other suitable materials which may be used.

In use the hook is baited and the sinker is attached to the fishing line by pinching or twisting the loop 23a, or both pinching and twisting it. The user then strips off the waterproof tape 25, which exposes the perforations, and makes his cast. As the sinker 16 and attaching device 17 strikes the water, the water gains access to the heating compound through the perforations, and the reaction which occurs melts the splicing alloy, whereupon the opposed parts of the attachment become severed and the weight of the sinker carries it downwardly, freeing the line to assume a position at or near the surface of the water as illustrated in dotted lines in Figure 1. We have found that when using a Liebowitz alloy as described in combination with anhydrous aluminum chloride the sinker will become detached in about one and a half to two seconds.

While we prefer to use a sinker in the shape of a fish, this is not essential; a sinker or weightable substance of any shape or size is contemplated as within the scope of our invention. The coupling device may be attached to the sinker or other weightable substance in any suitable manner, and to the fishing line or leader in any suitable manner.

In Figure 3 we show the fusible alloy 23 as spliced at 30 to extensions 31 which may be of some other metal. In Figure 4, the attaching wires 32 and 33 are of any desired metal and are spliced at 34 by Liebowitz alloy or some other low temperature fusing alloy or metal. These are but variations of our primary conception.

Although we have herein shown and described our invention in what we have conceived to be the most practical and preferred embodiments, it is recognized that departures may be made therefrom within the scope of our invention, which is not to be limited to the details disclosed herein but is to be accorded the full scope of the claims so as to embrace any and all equivalent structures.

The essence of our invention is an attaching device for securing a sinker or other weightable substance to a fishing line to facilitate casting, and which device embodies means actuated by reaction with water to rapidly sever the attachment and free the line from the sinker or other weightable substance.

Having described our invention, what we claim as new and desire to secure by Letters Patent is:

1. An article of fishing tackle comprising an attaching device for securing a sinker or other weightable substance to a fishing line to facilitate casting, said device comprising means actuated by reaction with water without tension on the line to rapidly sever the attachment and free the line from the sinker or other weightable substance before the line has sunk any substantial amount.

2. An article of fishing tackle comprising an attaching device for securing a sinker or other weightable substance to a fishing line to facilitate casting, said device comprising means actuated by reaction with water to rapidly sever the attachment and free the line from the sinker or other weightable substance, said attaching device including a wire between the line and the sinker or other weightable substance, and said means including a chemical of a group reacting strongly exothermically with water and adapted thereupon to melt the wire.

3. An article of fishing tackle comprising an attaching device for securing a sinker or other weightable substance to a fishing line to facilitate casting, said device comprising means actuated by reaction with water to rapidly sever the attachment and free the line from the sinker or other weightable substance, said attaching device including a coupling made of an alloy fusible at relatively low temperature between the line and the sinker or other weightable substance, and said means including a chemical of a group reacting strongly exothermically with water and adapted thereupon to melt the coupling.

4. An article of fishing tackle comprising an attaching device for securing a sinker or other weightable substance to a fishing line to facilitate casting, said device comprising means actuated by reaction with water to rapidly sever the attachment and free the line from the sinker or other weightable substance, said attaching device including a coupling made of an alloy comprising bismuth approximately 50%, lead approximately 25%, cadmium approximately 12½%, and tin approximately 12½%, between the line and the sinker or other weightable substance, and said means including a chemical of a group reacting strongly exothermically with water and adapted thereupon to melt the coupling.

5. An article of fishing tackle comprising an attaching device for securing a sinker or other weightable substance to a fishing line to facilitate casting, said device comprising means actuated by reaction with water to rapidly sever the attachment and free the line from the sinker or other weightable substance, said attaching device including a coupling made of an alloy fusible at relatively low temperature between the line and the sinker or other weightable substance, and said means including anhydrous aluminum chloride in the region of the coupling adapted to react in the presence of water to rapidly heat and melt the coupling.

6. An article of fishing tackle comprising an attaching device for securing a sinker or other weightable substance to a fishing line to facilitate casting, said device comprising means actuated by reaction with water to rapidly sever the attachment and free the line from the sinker or other weightable substance said attaching device including a coupling made of an alloy comprising bismuth approximately 50%, lead approximately 25%, cadmium approximately 12½%, and tin approximately 12½%, between the line and the sinker or other weightable substance, and said means including anhydrous aluminum chloride in the region of the coupling adapted to react in the presence of water to rapidly heat and melt the coupling.

7. An article of fishing tackle comprising an attaching device for securing a sinker or other weightable substance to a fishing line to facilitate casting, said device including a waterproof capsule, a coupling made of an alloy within said capsule fusible at relatively low temperature, and a chemical within the capsule in the region of the alloy adapted to react strongly exothermically with water to rapidly heat and destroy the splice to release the sinker or other weightable substance from the line.

8. A device as described in claim 7 in which the capsule is provided with perforations providing communication from the exterior of the capsule to the region occupied by the chemical, and a waterproof tape releasably wrapped around the capsule to cover the perforations until it is desired to use the device.

PAUL G. HENDERSON.
CECIL E. P. JEFFREYS.